United States Patent [19]
Murray

[11] 3,805,082
[45] Apr. 16, 1974

[54] PORTABLE POWER ACCESSORY WITH WATER BATH FOR NOISE SUPPRESSION

[76] Inventor: Jerome L. Murray, 652 First Ave., New York, N.Y. 10016

[22] Filed: Mar. 13, 1972

[21] Appl. No.: 234,237

Related U.S. Application Data

[63] Continuation-in-part of Ser. No. 4,833, Jan. 22, 1970.

[52] U.S. Cl. ............................ 290/1, 123/1, 290/2, 60/469, 60/1
[51] Int. Cl. ............................................. H02p 9/04
[58] Field of Search................... 115/.5 R; 290/1, 2; 60/278, 221, 469; 123/119, 1

[56] References Cited
UNITED STATES PATENTS

3,411,301  11/1968  Olsen ................................. 60/221
3,648,643  3/1972  Murray ................................ 115/.5
2,782,773  2/1957  Stone .................................... 123/1
2,187,074  1/1940  Caproni .......................... 123/119 A Primary Examiner—G. R. Simmons
Attorney, Agent, or Firm—Curtis, Morris & Safford

[57] ABSTRACT

A portable power accessory wherein an internal combustion engine coupled to an alternator or generator are housed in a fluid-tight housing and submerged in a tank of water. The water around the motor-generator unit acts as a muffler for the internal combustion engine as well as providing a safety barrier and acting as a cooling medium for the internal combustion engine. Appropriate air intake means are provided to supply air to the internal combustion engine and a suitable wiring harness extends from the generator unit to supply remote electrical accessories with electrical energy.

7 Claims, 1 Drawing Figure

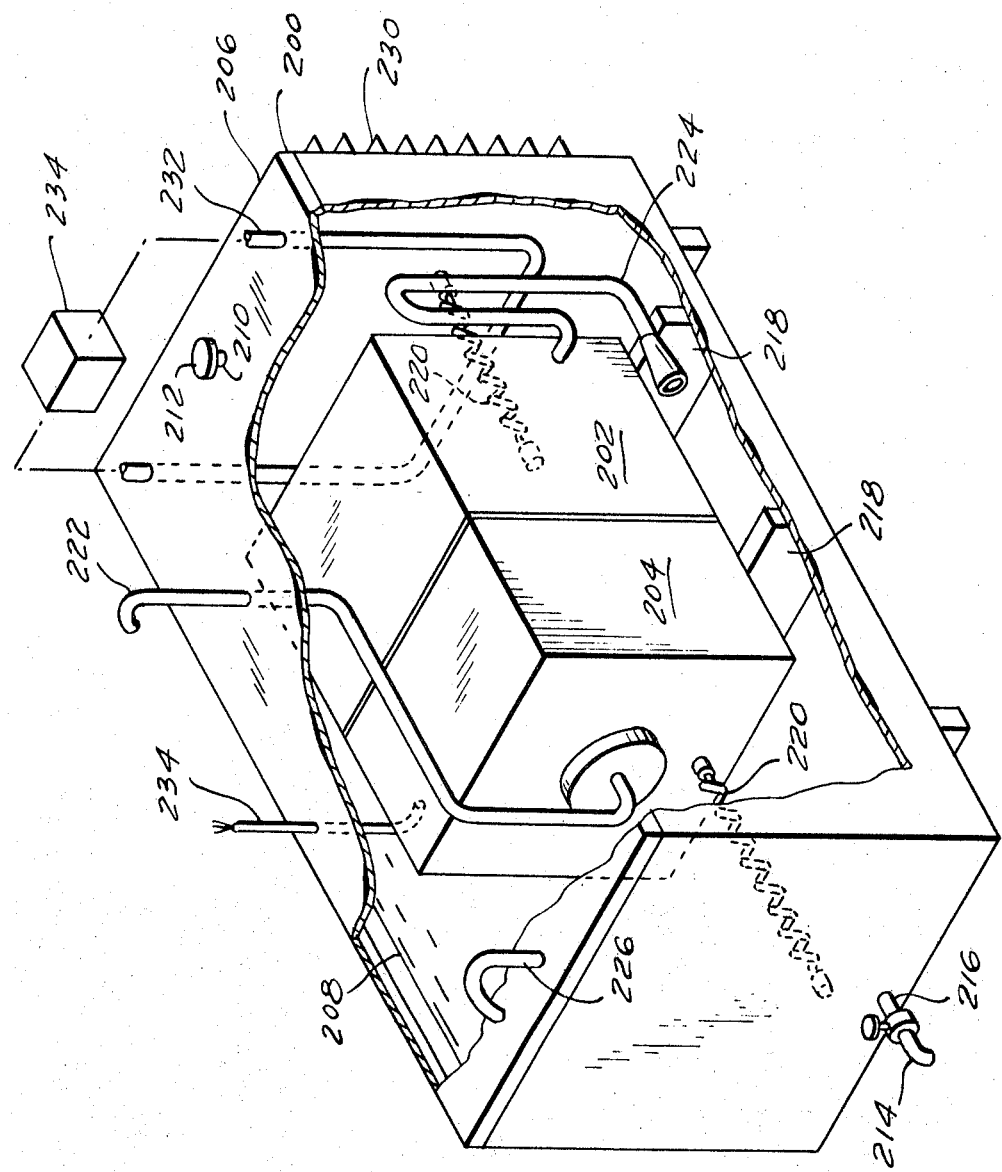

PORTABLE POWER ACCESSORY WITH WATER BATH FOR NOISE SUPPRESSION

This application is a continuation-in-part of co-pending application Serial No. 4,833, filed Jan. 22, 1970, which application is incorporated herein by reference.

The present invention relates to portable power accessories and more in particular to an internal combustion engine powered electrical generator useful as a portable source of electrical energy for remote electrical appliances.

Where a portable source of electrical energy is used, for example at construction sites or the like, it has been the practice to use an internal combustion engine to power an electrical generator or alternator which supplies electrical energy for various types of electrical appliances. The internal combustion engine produces a great deal of noise which is offensive and, where used in an urban setting, adds greatly to the noise discomfort incident to an urban environment. Additionally, the internal combustion engines poses a danger as a fire hazard especially in the presence of flammable materials.

Accordingly, it is an object of this invention to isolate the attendant noise and vibrations of an internal combustion engine which drives an electrical power generator.

It is another object of the invention to provide a relatively simple and inexpensive accesory adapted to supply electricity to remote electrical appliances free of noise and vibrations associated with a portable electric supply system in a manner so as to minimize the dangers of fire and explosion.

In accordance with a preferred embodiment of the present invention a motor-generator unit is housed within a tank so as to be submerged in a liquid such as water. The tank is completely enclosed and includes a filler cap through which water may be added to the tank, a drain through which water may be removed from the tank and a cradle upon which the motor-generator unit may rest. Spring members attached to the motor-generator unit and to the walls of the tank retain the motor-generator unit in a fixed orientation in the tank and an electrical power line extends from the generator portion of the motor-generator unit to supply electrical energy to a remote facility. An air inlet to the internal combustion engine of the motor-generator unit is also provided extending outside of the tank to draw in air for the combustion cycle. The products of combustion are exhausted directly into the liquid in the tank and assist in generating a liquid flow pattern around the internal combustion engine to cool the engine.

External cooling fins are provided on the tank to cool the walls of the tank and internal cooling tubes into which a cooling medium may be passed are also provided to cool the liquid surrounding the internal combustion engine. An exhaust outlet from the tank is also provided so that the products of combustion after flowing through the liquid in the tank may be exhausted to the atmosphere.

The construction of the preferred embodiment as well as further objects and advantages thereof will become further apparent from the following specification when considered in conjunction with the accompanying drawing wherein:

The single FIGURE of the drawing is a perspective view, partly broken away, showing a preferred embodiment of the present invention.

Referring now to the drawing, there is disclosed a tank 200 which is adapted to house a motor-generator unit 202–204 within a water-tight housing. While the description of the present invention refers to a combination motor-generator unit it is expressly understood that the generator may be a conventional generator or alternator and where the motor-generator unit is referred to such reference is meant to encompass both a conventional generator and alternator.

Tank 200 includes a removable top wall 206 to permit access to the interior to place the motor-generator unit therein. The tank is adapted to hold a quantity of liquid such as water 208 and has an internal volume sufficient to house the motor-generator unit so that the motor-generator may be completely submerged within the tank.

The tank is provided with an opening 210 through which water may be added and a cap 212 over opening 210 and a drain spout 214 which is selectively opened or closed by a suitable valve 216 when it is desired to drain tank 200.

A cradle assembly 218 is provided to support the motor-generator unit and springs 220 resiliently secure the motor-generator unit within tank 200.

An air supply means such as supply line 222 extends from motor-generator unit 202–204 through tank 200 to draw air from the atmosphere through the generator to the internal combustion engine to cool the generator and supply oxygen for the combustion cycle of the engine. Fuel for the engine may be supplied from an external fuel tank if desired or a separate fuel reservoir can be sealed within the water-tight housing enclosing the motor-generator unit.

The products of combustion are exhausted through an exhaust line 224 directly into the water 208 and the open end of exhaust line 224 is oriented so that the combustion products set up a circular flow pattern in the water 208 so that the water continuously circulates about the motor-generator unit to cool the unit. Exhaust line 224 includes a suitable valve member to preclude the entrance of water as more fully described in the aforementioned co-pending application. An exhaust line 226 is provided in the top wall 206 of tank 200 so that the gaseous products of combustion after flowing through the water 208 in the tank 200 may be exhausted to the atmosphere.

Because the products of combustion are discharged directly into the water 208 in tank 200, the water acts as a muffler as well as providing an insulative shield for safety to minimize the danger from fire and explosion. The insulative effect of the water barrier around the engine also muffles the sound of the engine itself.

Additional cooling for the water within tank 200 may be desirable and to this end cooling fins 230 are provided on the exterior surface of tank 200 to draw off heat by conduction from the water and to rapidly dissipate the heat by convection. Also cooling tubes 232 may be provided to circulate a refrigerant through the water from a suitable refrigeration unit 234.

The electrical energy generated by generator unit 204 is utilized by remote electrical appliances through suitable electrical wiring 234 extending from the generator through tank 200.

It is thus seen that novel and effective portable power accessory is provided for supplying remote electrical appliances with electricity, and yet, substantially eliminating the noise and vibrations of the electrical producing system as well as providing a much desired safety factor.

What is claimed is:

1. A portable power accessory for supplying electrical energy to remote electrical appliances comprising a water-tight vessel containing an internal combustion engine coupled to means for producing electrical energy, said vessel disposed within an enclosed container having internal wall surfaces spaced from the exterior surfaces of said vessel, said container having water therein completely surrounding said vessel, air supply means extending from said vessel above the surface of the water and the exterior of said container to supply air to said internal combustion engine, an exhaust conduit extending from said internal combustion engine into said water to exhaust the products of combustion into the water in said container whereby the water acts as a muffler for said internal combustion engine, said exhaust conduit including valve means for permitting said discharge and preventing water from entering said conduit and said vessel, and wiring means extending from said means for producing electrical energy to said remote electrical appliances.

2. The power accesory of claim 1 wherein said means for producing electrical energy comprises a generator driven by said internal combustion engine.

3. The power accessory of claim 1 wherein said means for producing electrical energy comprises an alternator driven by said internal combustion engine.

4. The power accesory of claim 3 wherein said alternator supplies alternating current to said appliances through said wiring means.

5. The power accessory of claim 1 wherein said internal combustion engine and said means for producing electrical energy are submerged under water within a tank and said air supply means and said wiring means extend from said tank.

6. The power accessory of claim 5 wherein said means to exhaust the products of combustion exhausts said products into the water in said tank to muffle the engine and create a flow pattern of the water in said tank around said engine to cool the engine, said tank including gas exhaust means to exhaust gaseous products of combustion to the atmosphere from said tank.

7. The power accessory of claim 6 including means to cool the water in said tank to remove heat from said water resulting from the heating effect of said engine.

* * * * *